United States Patent
Roh

(10) Patent No.: US 11,514,686 B2
(45) Date of Patent: Nov. 29, 2022

(54) METHOD AND APPARATUS FOR CONTROLLING PARKING OF VEHICLE

(71) Applicant: HYUNDAI MOBIS CO., LTD., Seoul (KR)

(72) Inventor: Hee Chang Roh, Suwon-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 33 days.

(21) Appl. No.: 17/370,295

(22) Filed: Jul. 8, 2021

(65) Prior Publication Data
US 2022/0012508 A1    Jan. 13, 2022

(30) Foreign Application Priority Data

Jul. 9, 2020 (KR) .................. 10-2020-0084602
Jul. 15, 2020 (KR) .................. 10-2020-0087208

(51) Int. Cl.
G06V 20/58    (2022.01)
H04W 4/40    (2018.01)
(Continued)

(52) U.S. Cl.
CPC .......... *G06V 20/586* (2022.01); *B60W 30/06* (2013.01); *G08G 1/143* (2013.01); *H04W 4/40* (2018.02);
(Continued)

(58) Field of Classification Search
CPC . G06V 20/586; G06V 2201/07; B60W 30/06; B60W 2420/52; B60W 2756/10;
(Continued)

(56) References Cited

U.S. PATENT DOCUMENTS 6,004,091 A * 12/1999 Roth .................. E04H 6/282
                                                       414/253
6,249,215 B1 * 6/2001 Dilz ................... B60R 25/043
                                                       340/988

(Continued)

FOREIGN PATENT DOCUMENTS

JP    2009-220614 A    10/2009

OTHER PUBLICATIONS

Extended European Search Report issued in corresponding European Application No. 1184176.2 dated Nov. 29, 2021.

*Primary Examiner* — Daryl C Pope
(74) *Attorney, Agent, or Firm* — Morgan, Lewis & Bockius LLP

(57) ABSTRACT

A method and apparatus for controlling parking are disclosed. The present disclosure in at least one embodiment provides an apparatus for controlling parking of a vehicle equipped with a radar sensor, including a processor for obtaining an input signal for parking control and determining whether to start a parking control operation, a radar controller configured, upon starting the parking control operation, to set a detection mode of the radar sensor to a normal detection mode or a heartbeat detection mode according to a target. The processor determines, when the candidate parking space is narrower than a space needed to park the vehicle, whether another parked vehicle is available to reposition, and if yes, detects whether or not the other parked vehicle carries a driver. The apparatus further includes a communication signal transmitter.

20 Claims, 4 Drawing Sheets

(51) Int. Cl.
*B60W 30/06* (2006.01)
*G08G 1/14* (2006.01)

(52) U.S. Cl.
CPC ..... *B60W 2420/52* (2013.01); *B60W 2756/10* (2020.02); *G06V 2201/07* (2022.01)

(58) Field of Classification Search
CPC ......... G08G 1/143; G08G 1/168; H04W 4/40; H04W 4/46; B62D 15/0285
See application file for complete search history.

(56) References Cited

U.S. PATENT DOCUMENTS

2015/0070196 A1    3/2015   Beaurepaire
2018/0029591 A1    2/2018   Lavoie

* cited by examiner (a)

(b)

METHOD AND APPARATUS FOR CONTROLLING PARKING OF VEHICLE

CROSS-REFERENCE TO RELATED APPLICATIONS

This application is based on, and claims priority from, Korean Patent Application Number 10-2020-0087208, filed Jul. 15, 2020, and Korean Patent Application Numer 10-2020-0084602, filed Jul. 9, 2020, the disclosure of which is incorporated by reference herein in its entirety.

TECHNICAL FIELD

The present disclosure in some embodiments relates to a method and an apparatus for controlling the parking of a vehicle.

BACKGROUND

The statements in this section merely provide background information related to the present disclosure and do not necessarily constitute prior art.

Recent increase of safety and convenience functions for vehicle drivers such as adaptive cruise control (ACC), autonomous emergency braking (AEB), and autonomous parking has brought about the active development of sensors for identifying the situation around the vehicle. Sensors attached to a vehicle include an image sensor, a lidar, a radar, and an ultrasonic sensor.

Of these sensors, the radar may be advantageously disposed inside the vehicle unlike the lidar, and it can observe a longer distance than the ultrasonic sensor. Unlike image sensors, radar sensors are hardly affected by weather.

Vehicles recently have electronic controllers (ECUs) incorporating a newer function of detecting an available parking area, which utilizes a radar or an ultrasonic sensor for detecting a parking space for a vehicle. However, parking lots occasionally bear to accommodate another over-parking vehicle selfishly taking up more than one parking spot and disabling one's vehicle ECU from recognizing the space as an available parking spot. Metropolitan areas in South Korea among other countries increasingly suffer from parking difficulties between the growing number of vehicles, which are aggravated by the parking space invasions contributing to wasted parking lots.

SUMMARY

According to at least one embodiment, the present disclosure provides an apparatus for controlling parking of a vehicle equipped with a radar sensor, including a processor configured to: obtain an input signal for parking control and determine whether to start a parking control operation. The processor is further configured to detect a candidate parking space by using sensing information obtained from the radar sensor. The processor is further configured to determine, when the candidate parking space is narrower than a space needed to park the vehicle, whether another parked vehicle is available to reposition, and if yes, detect whether or not the other parked vehicle carries a driver. The apparatus further includes a radar controller configured, upon starting the parking control operation, to set a detection mode of the radar sensor to a normal detection mode or a heartbeat detection mode according to a type of target, to set a frequency band, a detection angle, or a detection range of the radar sensor for detecting the target, and to calculate information about the target. The apparatus further includes a communication signal transmitter configured, upon a detection of the driver within the other parked vehicle, to send a signal of asking the driver about repositioning the other parked vehicle through V2V communications.

According to another embodiment, the present disclosure provides a method of controlling parking of a vehicle equipped with a radar sensor, including i) performing a parking control initiatiation by obtaining an input signal for parking control and determining whether to begin a parking control operation, ii) performing a candidate space detection by setting, when the parking control operation begins, a detection mode of the radar sensor to a normal detection mode, setting a frequency band, a detection angle, or a detection range of the radar sensor for detecting a target, and calculating information about the target to detect a candidate parking space, iii) performing a passenger information detection by setting the detection mode to a heartbeat detection mode, determining whether the candidate parking space is narrower than a space needed to park the vehicle, and upon determining that the candidate parking space is narrower than the space needed to park the vehicle, further determining whether another parked vehicle is present with an available space to concede, and upon determining that the other parked vehicle is present with the available space to concede, detecting whether or not the other parked vehicle carries a driver, and iv) requesting, upon determining that the other parked vehicle carries the driver, that the other parked vehicle be moved aside through vehicle-to-vehicle (V2V) communications.

REFERENCE NUMERALS

Figure 1:
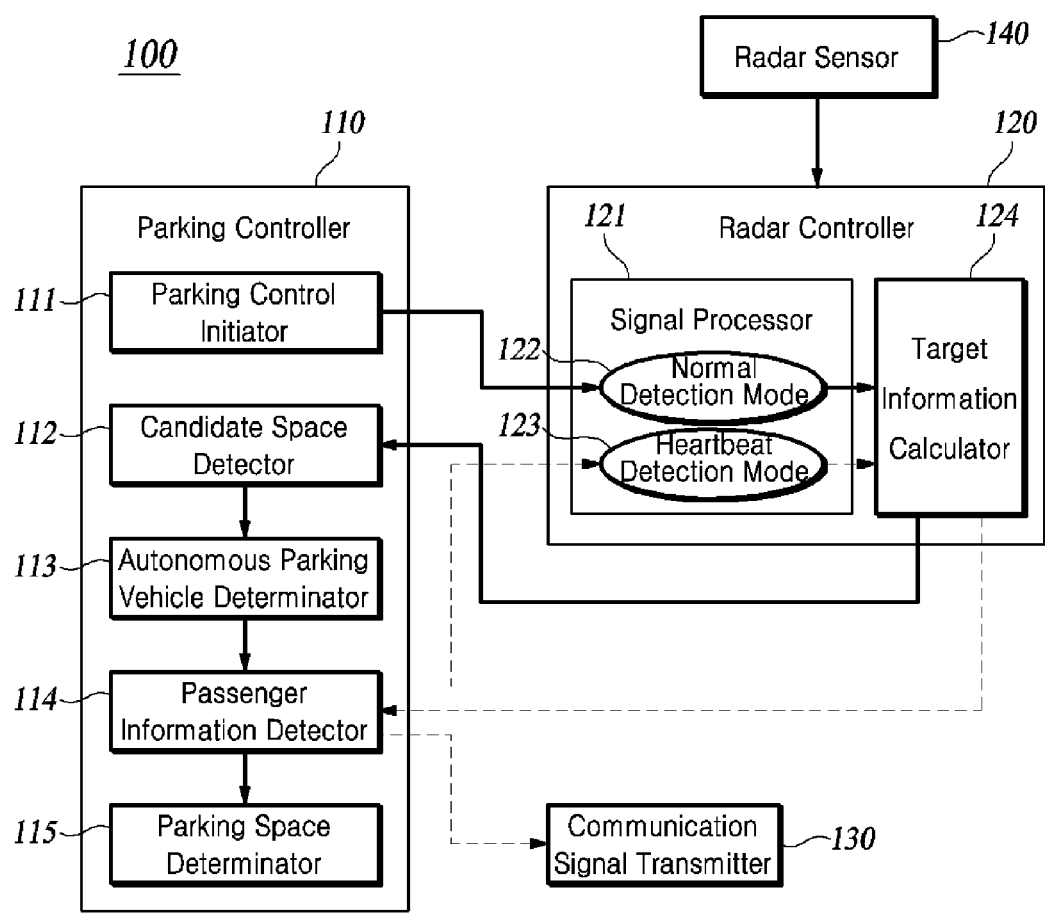
FIG. 1 is a block diagram of a parking control apparatus according to at least one embodiment of the present disclosure.

110: parking controller 111: parking control initiator
112: candidate space detector
113: autonomous parking vehicle determinator
114: passenger information detector 115: parking space determinator
120: radar controller 121: signal processor
124: target information calculator
130: communication signal transmitter

DETAILED DESCRIPTION

The present disclosure seeks to provide a method and an apparatus for detection of whether a driver is boarding inside another parked vehicle by using a radar sensor.

Additionally, the present disclosure seeks to provide a method and an apparatus for asking a driver when occupying the other parked vehicle about repositioning via Vehicle-to-Vehicle (V2V) communications by transmitting a repositioning request signal to the driver for giving consent to move aside.

Additionally, the present disclosure seeks to provide a method and an apparatus for transmitting a repositioning request signal via the V2V communications to the other parked vehicle as determined to be a self-parking capable vehicle carrying no driver, for repositioning or readjusting the self-parking capable vehicle driver-less into a legitimate parking position for the one vehicle to secure an available parking space.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a parking control apparatus 100 according to at least one embodiment of the present disclosure.

As shown in FIG. 1, the parking control apparatus 100 includes all or some of a parking controller 110, a radar controller 120, and a communication signal transmitter 130, and a radar sensor 140.

The parking controller 110 includes a processor. The processor has an associated non-transitory memory storing software instructions which, when executed by the processor, provides all or some of the functionalities of a parking control initiator 111, a candidate space detector 112, an autonomous parking vehicle determinator 113, a passenger information detector 114, and a parking space determinator 115. Herein, the memory and the processor may be implemented as separate semiconductor circuits. Alternatively, the memory and the processor may be implemented as a single integrated semiconductor circuit. The processor may embody one or more processor(s).

The communication signal transmitter 130 may be a hardware device implemented by various electronic circuits, e.g., a processor, to transmit and receive signals via wireless or wired connections.

The parking control initiator 111 determines whether to begin the parking control operation by obtaining an input signal for parking control. Upon receiving the input signal for parking control, the parking control initiator 111 may determine whether to start a parking control operation based on the input signal. The input signal may be various signals for starting the parking control operation. For example, the input signal may be a button input signal or a touchpad input signal for activating the parking control function. Alternatively, the input signal may be a signal generated and received from inside or outside of the vehicle when the vehicle enters a specific location. In particular, when the vehicle enters a parking lot, an input signal may be generated through the location information of the vehicle or may be generated and received by an input signal generator installed in the parking lot. Additionally, the input signal is not limited to the specifics herein and refers to all signals for starting parking control.

The candidate space detector 112 detects a candidate parking space by using sensing information obtained from the radar sensor 140. The candidate space detector 112 may operate to extract edge information included in the sensing information from the radar sensor 140, detect the positions of a plurality of targets, calculate distances between the targets, and detect a candidate space for parking. Here, the distances between the targets may be calculated by using distances between the extracted edge information items. Here, the edge information may be extracted from bumpers of other parked vehicles, and they may be extracted in the form of dots or lines.

Additionally, the candidate space detector 112 may group the extracted edge information items based on a preset criterion for forming one or more edge groups and may calculate and generate distances between the targets by using the distances between the edge groups formed.

The candidate space detector 112 detects a candidate parking space by using the calculated distances. In particular, when the distance between the detected targets is greater than or equal to a preset first reference distance, the candidate space detector 112 may detect the space between the detected targets as a candidate parking space. When the distance between the detected targets is less than a preset second reference distance and insufficient for the width of the vehicle, the candidate space detector 112 determines whether or not an available parking space can be secured by the movement of the other parked vehicle. Upon determining that an available parking space can be secured by the movement of the other parked vehicle, the candidate space detector 112 may transmit a control signal to the passenger information detector 114 to detect whether a driver is boarding in the other parked vehicle. After detecting the candidate parking space, the candidate space detector 112 may be responsive to a detection of a vehicle parked on the left or right side of the candidate parking space for transmitting a control signal to the autonomous parking vehicle determinator 113 to determine whether the other parked vehicle is a self-parking capable vehicle.

The autonomous parking vehicle determinator 113 determines whether the other parked vehicle is a self-parking capable vehicle capable of performing parking without driver intervention. The autonomous parking vehicle determinator 113 may determine whether the parked vehicle is a vehicle equipped with an autonomous parking function. V2V communications may be used to check whether or not the autonomous parking function is installed in the parked vehicle. When the parked vehicle has no V2V communication function, it is determined that no autonomous parking function is included in the parked vehicle.

Upon determining that the candidate parking space is narrower than the space required for parking of the vehicle, and then determining that the other parked vehicle can afford to move aside, the passenger information detector 114 detects whether a driver is boarding in the other parked vehicle. Upon receiving a control signal from the candidate space detector 112 to detect whether a driver is boarding inside the other parked vehicle, the passenger information detector 114 transmits a mode change signal to the radar controller 120 and in particular, its signal processor 121 which then allows the radar controller 120 to switch from a normal detection mode 122 to a heartbeat detection mode 123.

Additionally, even when the passenger information detector 114 determines that no driver is boarding inside the other parked vehicle, it is determined whether or not the other parked vehicle is a self-parking capable vehicle, and if yes, the passenger information detector 114 transmit a control signal to the communication signal transmitter 130 for allowing the same to transmit a request signal for autonomous repositioning to the other parked vehicle. Additionally, before directly transmitting the request for autonomous repositioning to the other parked vehicle, the communication signal transmitter 130 may transmit a movement consent request signal to a portable device of the driver of the other parked vehicle by utilizing a software application installed in the portable device to seek consent to reposition the other parked vehicle. This is achieved by first transmitting the movement consent request signal to the other parked vehicle which then causes its in-vehicle system to relay the movement consent request signal to the other vehicle driver's designated portable device.

The parking space determinator 115 confirms the candidate parking space as an available parking space upon determining that the candidate parking space is larger in width than the subject vehicle by a preset value. Additionally, the parking space determinator 115 may be operative upon determining that no obstacle is present in the candidate parking space and the candidate parking space is large enough to park the vehicle, to confirm the candidate parking space as an available parking space.

Multiples of the radar sensor 140 may be disposed on the front, rear, and left and right surfaces of the vehicle. The radar sensors 140 may be disposed on the vehicle to be used for various functions such as a forward vehicle tracking function, a blind spot detection function, an emergency collision prevention function, and a parking collision prevention function.

The radar sensor 140 may include a plurality of transmitting units and a plurality of receiving units. The radar signals transmitted from the transmitting units of the radar sensor 140 may be received by all of the plurality of receiving units. In other words, the radar sensor 140 may have a radar structure of a multi-input multi-output (MIMO) system. The radar sensor 140 may have a field of view (FOV) of 140 degrees to 160 degrees.

The radar sensor 140 may be an ultra wide band (UWB) radar sensor 140 for transmitting and receiving radar signals in an ultra wide frequency band or a frequency-modulated continuous-wave (FMCW) radar sensor 140 for transmitting and receiving radar signals including frequency-modulated signals. The radar sensor 140 may adjust a detection range by adjusting the output values of transmission signals by using an included amplifier (not shown).

The radar controller 120 includes a processor and an associated non-transitory memory storing software instructions which, when executed by the processor, provides the functionalities of a signal processor 121 and a target information calculator 124. The radar controller 120 is provided with the signal processor 121 for removing clutter included in the signals received by the radar sensor 140 and the target information calculator 124 for calculating the information on the target based on the processed signals by the signal processor 121. Here, the clutter refers to unnecessary reflected radar signals generated by road surfaces, rain, obstacles, or jamming signals.

When the parking control operation is started, the radar controller 120 may perform control to change the frequency bandwidth of the radar signals transmitted by the radar sensor 140, the detection angle of the radar sensor 140, or the detection range of the radar sensor 140. For example, when the parking control operation is started, the radar controller 120 may control the radar sensor 140 electronically or mechanically to vary at least one of a detection angle and a detection range of the radar sensor 140.

Additionally, when the radar controller 120 receives a parking control operation initiation signal from the parking control initiator 111, it sets out the normal detection mode 122 to perform signal processing and operates, upon receiving a mode change signal from the passenger information detector 114, to switch to the heartbeat detection mode 123 is set to perform the relevant signal processing.

The signal processor 121 may switch between the detection modes according to the received signal. The signal processor 121 may operate by being set to the normal detection mode 122 and the heartbeat detection mode 123, respectively. The signal processor 121 receives signals from the radar sensor 140 and filters those signals to obtain valid information contained therein for target detection. The number of signal processing modes is not limited to two.

The signal processor 121 processes the signal received from the radar sensor 140 by using the normal detection mode 122 in a situation for detecting where a candidate parking space is. However, the signal processor 121 may operate, upon receiving a mode change signal from the passenger information detector 114, to switch to the heartbeat detection mode 123 for searching for a target.

The normal detection mode 122 utilizes a band-pass filter for removing signal components outside of the frequency band corresponding to the radar signals transmitted by the radar sensor 140 while removing the reflected signal components of the transmitted radar signals, which are reflected off the road surface. A moving average method may be used to remove not only the reflected signal components but also the clutter generated in the radar transmission/reception signals. Here, the moving average method is a method of using the average value of time series data corresponding to a certain period to tell the overall trend.

The normal detection mode 122 may be driving mode for detecting a target in front of the radar sensor 140 while driving the vehicle or a parking mode for detecting a nearby target and a candidate parking space while in a parking situation.

When the signal processor 121 is set to the heartbeat detection mode 123, it removes signal components outside of the frequency band corresponding to the other vehicle occupant's heartbeat and removes received signals that are transmitted radar signals received after being reflected from a road surface. Additionally, the heartbeat detection mode 123 uses the moving average method for removing clutter in addition to the reflected signals in receipt, which are the transmitted radar signals after being reflected. Additionally, when the signal processor 121 is set to the heartbeat detection mode 123, it may increase the resolution of the radar sensor 140 by maximizing the frequency bandwidth of the transmitted radar signals.

When the radar signals are received by the radar sensor 140 after being reflected by a human heart, not an obstacle made of a rigid body, it also receives information about the heartbeat frequency. Since the human heartbeat frequency is 0.66 Hz to 3 Hz, the heartbeat detection mode 123 uses a bandpass filter to determine and remove frequency components outside of 0.66 Hz to 3 Hz as clutter.

This is not the only filtering method for removing the clutter by the signal processor 121 that detects the target from the received signal, and anyone of ordinary skill in the art may add, remove or change other types of filters. In other words, different frequency ranges may be chosen for obtaining signal information about the occupant's heartbeat. For example, the heartbeat detection mode 123 may use a bandpass filter for removing frequency components outside of 0.8 Hz to 4 Hz.

The present disclosure can also set a bandpass filter for detecting breathing as well as the other vehicle occupant's heartbeat. For example, to obtain signal information about breathing other than the occupant's heartbeat, the signal processor 121 may determine and remove frequency components other than 0.1 Hz to 0.6 Hz as clutter.

The target information calculator 124 may include a target detector (not shown) for detecting a radar signal reflected from a target, and a distance measurement unit or distance calculator (not shown) for measuring a distance from the detected target to the radar sensor 140, and an azimuth calculator (not shown) for measuring an azimuth angle from the radar sensor 140 to the detected target. Additionally, the target information calculator 124 may also measure the moving speed of the target.

Upon receiving a signal processed by the signal processor 121 using the normal detection mode 122, the target information calculator 124 may calculate a target information. The target information calculator 124 measures the distance and azimuth angle between the vehicle and the target. The target information calculator 124 calculates information on the target and transmits it to the candidate space detector 112.

Upon receiving a signal processed by the signal processor 121 using the heartbeat detection mode 123, the target information calculator 124 may detect the heartbeat of a pedestrian. Furthermore, the target information calculator 124 may measure the heartbeat rate of the pedestrian. The target information calculator 124 measures the distance and azimuth angle between the vehicle and the pedestrian when detecting the heartbeat of the pedestrian. The target information calculator 124 calculates and transmits information on heartbeat detection to the passenger information detector 114.

In response to a detection of a driver in the other parked vehicle, the communication signal transmitter 130 asks the driver to reposition the other parked vehicle via vehicle-to-vehicle (V2V) communications. On the other hand, when no driver is detected in the other parked vehicle and it is determined that the other parked vehicle is a self-parking capable vehicle, the communication signal transmitter 130 signals to the other parked vehicle to request repositioning of the parked vehicle. In this case, the present disclosure may configure the communication signal transmitter 130 to transmit a movement consent request signal to a portable device of the other driver to seek a decisive consent from the other driver before making the direct request for the other parked vehicle to unfold its autonomous parking function to reposition legitimately.

Figure 2:
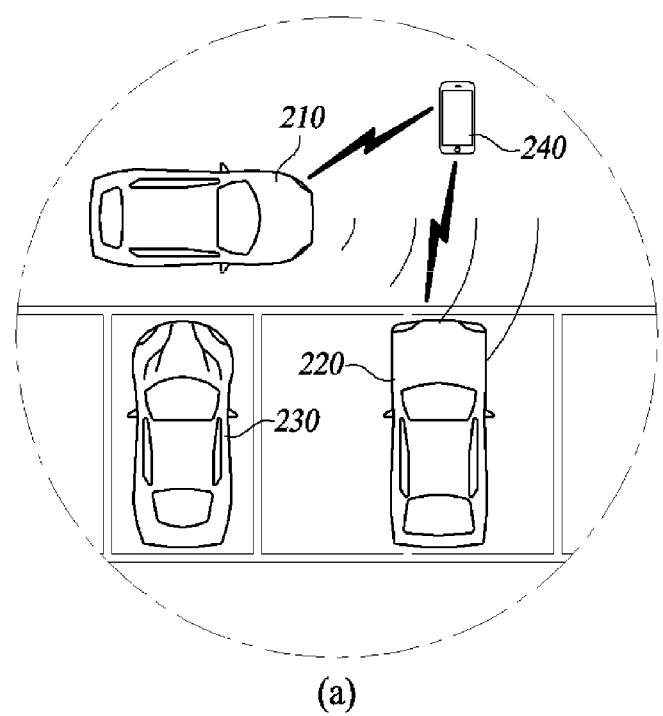
FIG. 2 is an explanatory diagram for explaining at least one embodiment of a parking control apparatus of the present disclosure.
Figure 2:
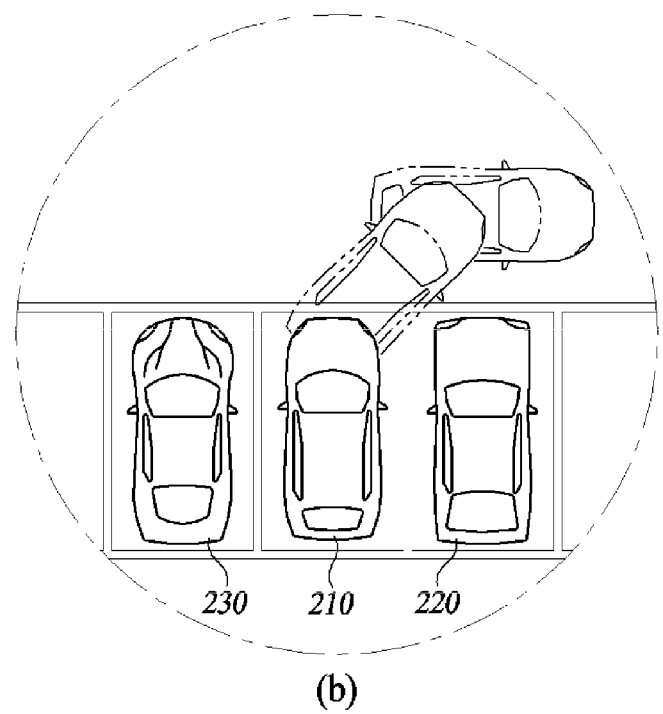

FIG. 2 is an explanatory diagram for explaining at least one embodiment of a parking control apparatus of the present disclosure.

FIG. 2 is to discuss around one radar sensor 140 disposed on the front side of the vehicle, but the embodiments of the present disclosure are equally applied to the radar sensors 140 disposed on the left and right sides of the vehicle and the rear side of the vehicle.

FIG. 2 illustrates at (a) a first parked vehicle 220 and a second parked vehicle 230, of which the first parked vehicle 220 is the overparking matter stepping on the parking line, who may still let the candidate space detector 112 detect a false candidate parking space between the first and second parked vehicles 220 and 230 while blocking others from using the narrowed parking slot. In this case, the driving vehicle 210 utilizes the radar sensor 140 for detecting whether there is an available space in which the first parked vehicle 220 can move aside to its right side, and if yes, transmits a signal to the passenger information detector 114 for the same to detect whether a driver is boarding in the first parked vehicle 220. FIG. 2(a) illustrates the first parked vehicle 220 as stepping on the parking line, but this embodiment also works well with other situations including over-parking in unmarked parking lots and where the driving vehicle 210 is unsuitably oversized for the width of the candidate parking space.

The passenger information detector 114 transmits a mode change signal to the signal processor 121 for the same to set its detection mode to the heartbeat detection mode 123 for causing the radar controller 120 to detect whether or not the first parked vehicle 220 carries a driver. Upon determining that the driver is boarding in the first parked vehicle 220, the radar controller 120 transmits a driver detection signal to the passenger information detector 114. Upon receiving the driver detection signal, the passenger information detector 114 transmits a repositioning request signal to the driver in the first parked vehicle 220 by using the communication signal transmitter 130.

The passenger information detector 114 may determine that no driver is boarding in the first parked vehicle 220 and the autonomous parking vehicle determining unit 113 may determine that the first parked vehicle 220 is a self-parking capable vehicle, when passenger information detector 114 transmits a repositioning request signal directly to the first parked vehicle 220. Here, before transmitting the repositioning request signal directly to the first parked vehicle 220, the communication signal transmitter 130 may ask for consent from the driver about repositioning the first parked vehicle 220 by transmitting a movement consent request signal to a portable device of the driver of the first parked vehicle 220.

As shown in FIG. 2 at (b), when the first parked vehicle 220 has moved aside, the parking space determinator 115 may determine that parking is possible in the candidate parking space and thereby confirm the candidate parking space as an available parking space.

Figure 3:
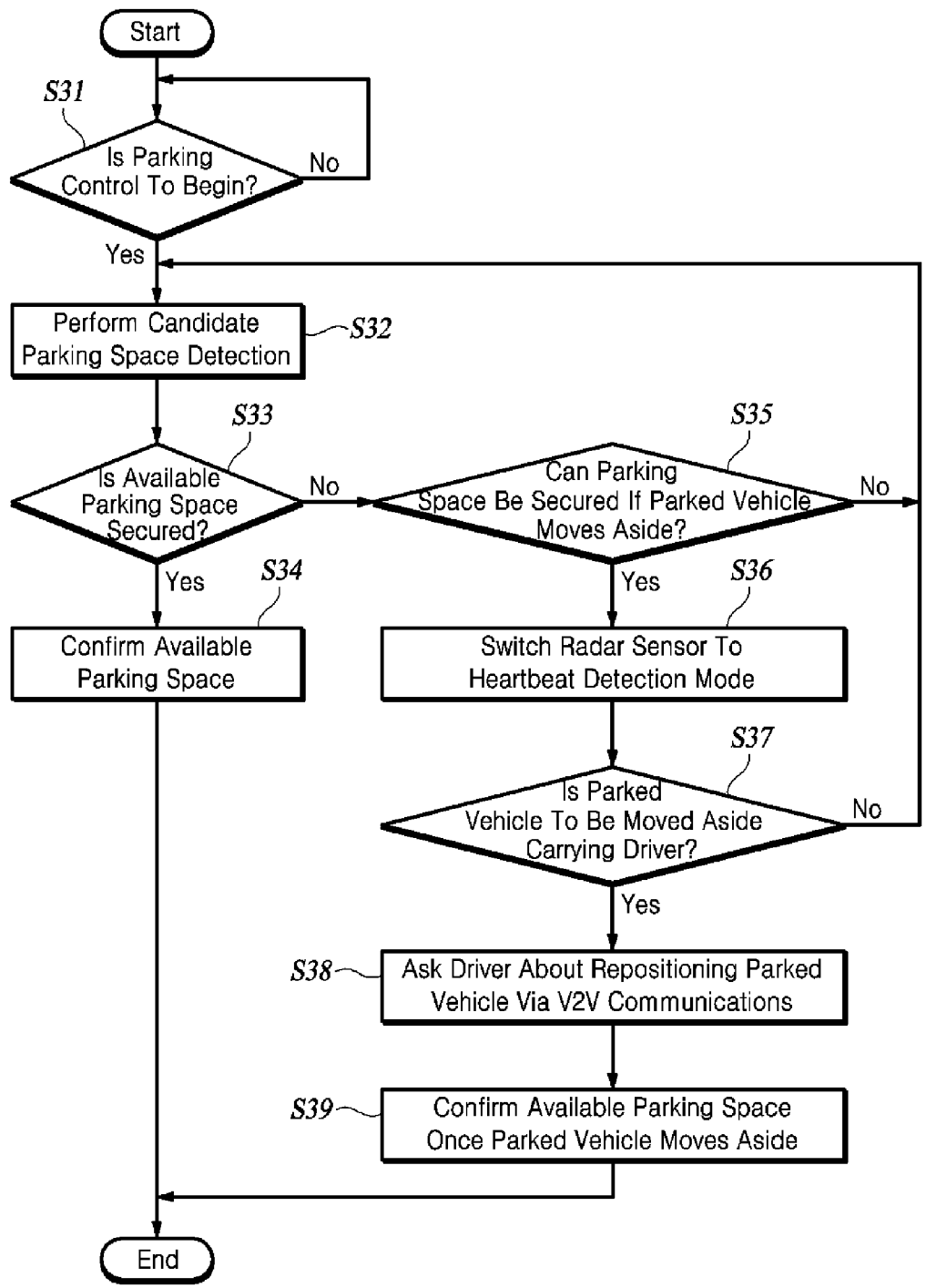
FIG. 3 is a flowchart of a parking control method according to at least one embodiment of the present disclosure.

FIG. 3 is a flowchart of a parking control method according to at least one embodiment of the present disclosure.

The first step determines whether or not to begin a parking control operation (S31). Determination of whether to begin the parking control operation may be made by obtaining an input signal for parking control from the subject driver and using the input signal as a basis for the determination. Step S31 maintains until a parking control operation is determined to be initiated, when the parking control method proceeds to the next step.

When the parking control operation is determined to be initiated, a candidate parking space detection is performed (S32). In response to the parking control operation initiated, the parking control method sets the radar controller 120 to the normal detection mode, sets a frequency band, a detection angle, or a detection range of the radar sensor 140 for detecting a target, and calculates information about the target to detect a candidate parking space. The normal detection mode 122 may use a bandpass filter to remove signal components outside of the frequency band corresponding to the radar signal transmitted by the radar sensor 140.

When the candidate parking space is detected, the parking control method determines whether or not an available parking space is secured (S33). Determination of whether an available parking space is secured is made by comparing the width of the candidate parking space with the width of the subject driver's vehicle. The width of the driver's vehicle varies by vehicle type. When the width of the candidate parking space is greater than or equal to a value obtained by adding a preset value to the width of the vehicle, it may be determined that the available parking space is secured. Upon determining that the available parking space is secured, the availability of the space is confirmed (S34). Upon confirming the available parking space, the parking control algorithm ends.

When it is determined that no available parking space is secured, the parking control method determines whether the available parking space is secured if the parked vehicle were repositioned (S35). Here, the parked vehicle means a vehicle parked on the left or right side of the candidate parking space. Whether or not the parked vehicle can afford to reposition may be determined by using the radar sensor 140. When it is determined that the available parking space is not secured even if the parked vehicle were repositioned, the parking control method returns to Step S32 to search for another candidate parking space.

Upon determining that the parking space is secured if the parked vehicle were repositioned, the detection mode of the radar sensor 140 is switched to the heartbeat detection mode 123 (S36). Here, the heartbeat detection mode 123 may use a bandpass filter to remove signal components outside of a frequency band corresponding to a heartbeat rate of an occupant of the other parked vehicle. After switching the detection mode to the heartbeat detection mode 123, the parking control method determines whether a driver is in the vehicle that needs repositioning (S37).

When it is determined that the driver is boarding the vehicle that needs repositioning, the parking control method asks the driver about repositioning the other parked vehicle via V2V communications (S38). When it is determined that no driver is in the vehicle that needs repositioning, the parking control method returns to Step S32 to search for another candidate parking space.

When it is determined that an available parking space is secured after the vehicle that needed repositioning has conceded, the parking control method confirms the available parking space (S39). However, although not shown in FIG. 3, when the repositioning request to the other parked vehicle has been made in vain through V2V communications within a preset period or when the other parked vehicle lacks a V2V communication function, the parking control method may return to Step S32 to search for other parking spaces. Once the available parking space is confirmed, the parking control algorithm ends.

Figure 4:
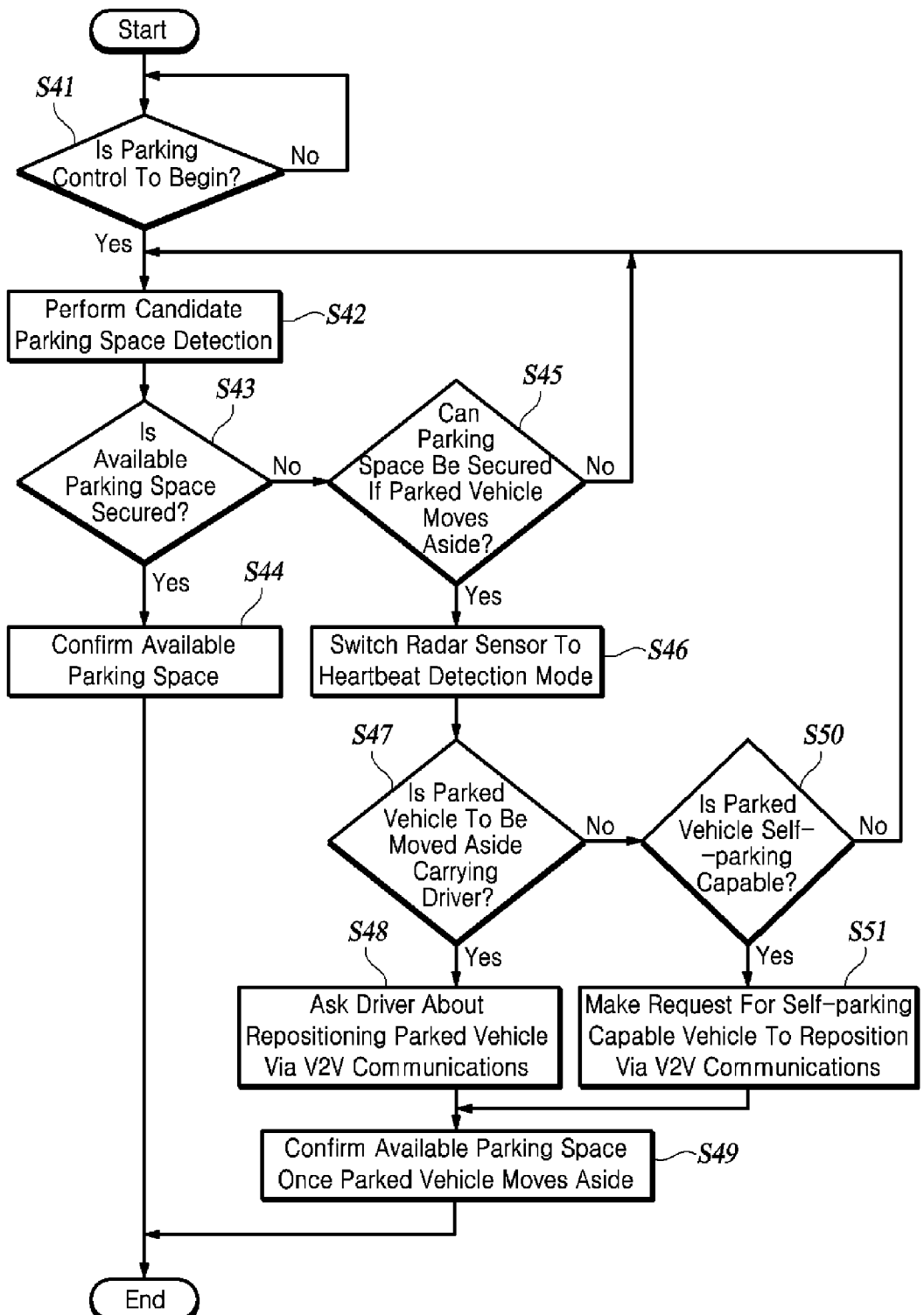
FIG. 4 is a flowchart of a parking control method according to at least one embodiment of the present disclosure.

FIG. 4 is a flowchart of a parking control method according to at least one embodiment of the present disclosure.

In explaining FIG. 4, a detailed description of the steps common to FIG. 3 is omitted. Step S41 to S49 of FIG. 4 may be the same or corresponding process as step S31 to S39 of FIG. 3.

When it is determined that no driver is in the vehicle that needs repositioning (S47), the parking control method determines whether the parked vehicle is a self-parking capable vehicle (S50). Upon determining that the parked vehicle is not a self-parking capable vehicle, the parking control method returns to Step S42 to try to detect another candidate parking space. Upon determining that the parked vehicle is a self-parking capable vehicle, the parking control method requests the self-parking capable vehicle to reposition via V2V communications (S51). After step S51, the parking control method proceeds to the step S49. Although not shown in FIG. 4, when the self-parking capable vehicle stays put despite the repositioning request, the parking control method may return to Step S42 and set out to detect another candidate parking space.

As described above, according to some embodiments of the present disclosure, the parking control apparatus and its control method of one vehicle detect the heartbeat of a person by using a radar sensor for detecting whether other parked vehicle carries a driver who may be otherwise hardly visible to naked eyes.

Additionally, according to some embodiments of the present disclosure, the parking control apparatus and its control method of the one vehicle transmit a repositioning request signal to reposition or readjust the other parked vehicle via Vehicle-to-Vehicle (V2V) communications to the other parked vehicle when carrying a driver who can then consent to reposition the other parked vehicle for the one vehicle to secure an available parking space.

Additionally, according to some embodiments of the present disclosure, the parking control apparatus and its control method of the one vehicle transmit a repositioning request signal via the V2V communications, upon determining that the other parked vehicle is a self-parking capable vehicle carrying no driver, to the other parked vehicle for repositioning the self-parking capable vehicle driver-less into a legitimate parking position for the one vehicle to secure an available parking space.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for controlling parking of a vehicle equipped with a radar sensor, the apparatus comprising:
   a processor configured to:
      obtain an input signal for parking control and determine whether to start a parking control operation;
      detect a candidate parking space by using sensing information obtained from the radar sensor;
      determine whether the candidate parking space is narrower than a space needed to park the vehicle, and upon determining that the candidate parking space is narrower than the space needed to park the vehicle, further determine whether another parked vehicle is present with an available space to concede to the vehicle, and upon determining that the other parked vehicle is present with the available space to concede to the vehicle, detect whether or not the other parked vehicle carries a driver;
      determine whether the other parked vehicle is a self-parking capable vehicle that is capable of performing parking without a driver's intervention;
   a radar controller configured, upon starting the parking control operation, to set a detection mode of the radar sensor to a normal detection mode or a heartbeat detection mode according to a type of a target to be detected, to set a frequency band, a detection angle, or a detection range of the radar sensor for detecting the target, and to calculate information about the target; and a communication signal transmitter configured, upon a detection of the driver within the other parked vehicle, to send a signal of asking the driver about repositioning the other parked vehicle.

2. The apparatus of claim 1, wherein the communication signal transmitter is further configured, upon a determination that the other parked vehicle is a self-parking capable vehicle carrying no driver to be detected, to send a direct request signal of repositioning to the other parked vehicle.

3. The apparatus of claim 2, wherein the communication signal transmitter is further configured, upon the determination that the other parked vehicle is a self-parking capable vehicle carrying no driver to be detected, to transmit a movement consent request signal to a portable device of the driver to seek a consent from the driver before sending the direct request signal of repositioning to the other parked vehicle.

4. The apparatus of claim 1, wherein the processor is further configured to
confirm the candidate parking space as an available parking space upon determining that the candidate parking space is larger in width than the vehicle by a preset value.

5. The apparatus of claim 4, wherein the detection angle of the radar sensor is adjusted based on a driving direction of the vehicle by a preset angle for the detection angle to align with a scanning direction.

6. The apparatus of claim 1, wherein the processor is further configured to extract edge information included in the sensing information for detecting positions of a plurality of targets and to calculate and generate a distance between the targets for detecting a candidate space for parking.

7. The apparatus of claim 6, wherein the processor is further configured to calculate and generate the distance between the targets by using a distance between extracted edge information items.

8. The apparatus of claim 6, wherein the processor is further configured to perform grouping of extracted edge information items based on a preset criterion for forming one or more edge groups and to calculate and generate the distance between the targets by using a distance between the edge groups.

9. The apparatus of claim 6, wherein the processor is further configured, when the distance between the targets is greater than or equal to a first preset reference distance, to detect a space between the targets as the candidate parking space.

10. The apparatus of claim 6, wherein the processor is further configured, when the distance between the targets is equal to or less than a second preset reference distance, to determine whether or not a parking space is securable by moving the other parked vehicle aside, and upon determining that the parking space is securable by moving the other parked vehicle aside, to transmit a control signal for detecting whether the other parked vehicle carries a driver.

11. The apparatus of claim 4, wherein the processor is further configured to be operative upon determining that no obstacle is present in the candidate parking space and the candidate parking space is large enough to park the vehicle, to confirm the candidate parking space as an available parking space.

12. The apparatus of claim 1, wherein the processor is further configured to transmit a mode change signal to the radar controller for setting the radar controller to the heartbeat detection mode.

13. The apparatus of claim 1, wherein the radar controller, when set to the heartbeat detection mode, is further configured to:
remove signal components outside of a frequency band corresponding to a heartbeat rate of an occupant of the other parked vehicle,
remove a received signal that is a radar signal after being transmitted by the radar sensor and reflected from a road surface, and
remove clutter other than the received signal.

14. The apparatus of claim 13, wherein the heartbeat detection mode uses a bandpass filter for removing signal components outside of 0.66 Hz to 3 Hz.

15. The apparatus of claim 1, wherein the radar controller, when set to the heartbeat detection mode, is further configured to
use a bandpass filter for removing signal components outside of a frequency band corresponding to a radar signal transmitted by the radar sensor.

16. A method of controlling parking of a vehicle equipped with a radar sensor, the method comprising:
performing a parking control initiation including: obtaining an input signal for parking control, and determining whether to begin a parking control operation;
performing a candidate space detection including: when the parking control operation begins, setting a detection mode of the radar sensor to a normal detection mode, setting a frequency band, a detection angle, or a detection range of the radar sensor for detecting a target, and calculating information about the target to detect a candidate parking space;
performing a passenger information detection including: setting the detection mode to a heartbeat detection mode, determining whether the candidate parking space is narrower than a space needed to park the vehicle, and upon determining that the candidate parking space is narrower than the space needed to park the vehicle, further determining whether another parked vehicle is present with an available space to concede, and upon determining that the other parked vehicle is present with the available space to concede, detecting whether or not the other parked vehicle carries a driver; and
asking the driver, upon determining that the other parked vehicle carries the driver, to reposition the other parked vehicle through vehicle-to-vehicle (V2V) communications.

17. The method of claim 16, further comprising
making a direct request to the other parked vehicle, upon determining that the other parked vehicle is a self-parking capable vehicle carrying no driver, for the other parked vehicle to reposition through the V2V communications.

18. The method of claim 17, wherein the making of the direct request further comprises
asking a consent from the driver of the other parked vehicle to reposition the other parked vehicle, and making the direct request to the other parked vehicle, upon receiving the consent from the driver, for the other parked vehicle to reposition.

19. The method of claim 16, wherein the heartbeat detection mode utilizes a bandpass filter for removing signal components outside of a frequency band corresponding to a heartbeat rate of an occupant of the other parked vehicle.

20. The method of claim 16, further comprising
confirming the candidate parking space as an available parking space upon completing the asking to the driver or the making of the direct request to find that the candidate parking space is cleared of the other parked vehicle after repositioning.

\* \* \* \* \*